US012640328B2

(12) United States Patent
Royer et al.

(10) Patent No.: US 12,640,328 B2
(45) Date of Patent: May 26, 2026

(54) METHOD FOR PRODUCING AN ANODE FOR A COLD CATHODE X-RAY SOURCE

(71) Applicant: THALES, Meudon (FR)

(72) Inventors: Guillaume Royer, Velizy-Villacoublay (FR); Christophe Bourat, Velizy-Villacoublay (FR); Michel Caplot, Moirans (FR); Mickaël Joinet, Velizy-Villacoublay (FR); Pierre Ribault, Moirans (FR)

(73) Assignee: THALES, Meudon (FR)

( * ) Notice: Subject to any disclaimer, the term of this patent is extended or adjusted under 35 U.S.C. 154(b) by 191 days.

(21) Appl. No.: 18/835,133

(22) PCT Filed: Jan. 31, 2023

(86) PCT No.: PCT/EP2023/052250
§ 371 (c)(1),
(2) Date: Aug. 1, 2024

(87) PCT Pub. No.: WO2023/148143
PCT Pub. Date: Aug. 10, 2023

(65) Prior Publication Data

US 2025/0140507 A1 May 1, 2025

(30) Foreign Application Priority Data

Feb. 1, 2022 (FR) ...................................... 2200892

(51) Int. Cl.
*H01J 35/08* (2006.01)

(52) U.S. Cl.
CPC ......... *H01J 35/08* (2013.01); *H01J 2235/062* (2013.01); *H01J 2235/081* (2013.01); *H01J 2235/084* (2013.01)

(58) Field of Classification Search
CPC ........................................................ H01J 35/08
See application file for complete search history.

(56) References Cited

U.S. PATENT DOCUMENTS 6,487,272 B1 * 11/2002 Kutsuzawa ........... H01J 35/186 378/129
7,359,487 B1 * 4/2008 Newcome ............... H01J 35/13 378/119

(Continued)

FOREIGN PATENT DOCUMENTS

WO 2006/063982 A1 6/2006
WO 2013/020151 A1 2/2013

OTHER PUBLICATIONS

"Wolfram—Tungsten", Feb. 23, 2009 (Feb. 23, 2009), pp. 1-36. Retrieved from the Internet: https ://web.arc hi ve.org/web/ 20090223065631/http:/ /www.plansee.com/lib/Tungsten_DE. pdf.

*Primary Examiner* — Hugh Maupin
(74) *Attorney, Agent, or Firm* — BakerHostetler

(57) ABSTRACT

A production method for producing an anode for a cold cathode X-ray source, including the following steps: producing an element referred to as target from a first material adapted to generating X-rays from the absorption of an electron beam, the first material having a first thermal expansion coefficient Ce,1(Tu) at a predetermined temperature Tu of use of the anode in the X-ray source, producing an element referred to as target support from a second material having a second thermal expansion coefficient Ce,2(Tu) at the predetermined temperature Tu, joining the target to the target support by hard soldering using a solder material at a soldering temperature higher than the predetermined temperature Tu and higher than a melting point of the solder material, so as to form a film of solder interposed between the target and the target support.

16 Claims, 3 Drawing Sheets

(56) References Cited

U.S. PATENT DOCUMENTS

| | | | |
|---|---|---|---|
| 2008/0101541 | A1 | 5/2008 | Steinlage et al. |
| 2016/0133430 | A1 | 5/2016 | Yamada et al. |
| 2016/0203939 | A1 | 7/2016 | Van Der Borst et al. |

* cited by examiner

METHOD FOR PRODUCING AN ANODE FOR A COLD CATHODE X-RAY SOURCE

CROSS-REFERENCE TO RELATED APPLICATIONS

This application is a National Stage of International patent application PCT/EP2023/052250, filed on Jan. 31, 2023, which claims priority to foreign French patent application No. FR 2200892, filed on Feb. 1, 2022, the disclosures of which are incorporated by reference in their entireties.

FIELD OF THE INVENTION

The present invention relates to the field of X-ray sources.

BACKGROUND

X-rays are these days in imaging, notably in the medical field, in industry for performing nondestructive testing, and in security for detecting dangerous objects or materials.

The sources most commonly used are X-ray tubes. An X-ray tube generally consists of a vacuum chamber. The envelope is formed of a metal structure and of an electrical insulator. Two electrodes are positioned in this envelope. In the case of a monopolar tube, a cathode electrode, held at a negative potential, is equipped with an electron emitter. A second, anode, electrode, held at a potential that is positive in relation to the first electrode, is associated with a target. The electrons accelerated by the potential difference between the two electrodes produce a continuous spectrum of braking ionizing radiation (bremsstrahlung) as they strike the target. The metal electrodes are generally large in size and have radii of curvature that are large enough to minimize the electrical fields on their surface.

Depending on the power of the X-ray tubes, these may be equipped either with a fixed anode or with a rotary anode adapted to spread the thermal power. Fixed-anode tubes have a power of a few kilowatts and are notably used in industrial applications, security applications and low-power medical applications. Rotary-anode tubes may exceed 100 kilowatts and are chiefly employed in the medical field for imaging that requires short-duration high doses of X-rays. By way of example, the diameter of an industrial tube is of the order of 150 mm at 450 kV, of 100 mm at 220 kV and of 80 mm at 160 kV. The voltage indicated corresponds to the potential difference applied between the two electrodes. For rotary-anode medical tubes, the diameter varies from 150 to 300 mm depending on the power to be dissipated at the anode.

The anode that forms the target has to dissipate a significant amount of thermal power. This dissipation may be achieved by circulating a heat-transfer fluid, or by creating a large-sized rotary anode. The need for this dissipation therefore also entails increasing the dimensions of the X-ray tubes.

In the case of a stationary anode, the technology used as standard at the present time is a sub-assembly made up of a thin insert made of pure tungsten or of tungsten-rhenium alloy, around which a significant copper body is overmolded. FIG. 1 is a photograph of an example of an anode AA of the prior art for an X-ray source. This anode AA comprises a tungsten insert C that forms the target struck by the electron beam in order to generate the X-ray radiation. The overmolding of this target C forms a copper body BC adapted to removing the thermal power produced by the braking of the electron beam. Here, the removal of the power is achieved by excellent thermal contact between the insert and the copper bar, the latter being a very good conductor of heat.

The anode of FIG. 1 is satisfactory. However, the use of copper overmolding to dissipate the power accumulated during the source duty cycle makes miniaturizing the source very difficult. Specifically, in order to miniaturize the source, it is necessary to ensure a high level of electrical insulation between the cathode and the anode, by using an electrical insulator. This mechanical component may for example form part of the vacuum chamber. These ceramics are therefore advantageous for creating miniaturized X-ray sources. However, copper is difficult to assemble with ceramic because of the high levels of thermal expansion of copper compared to ceramic.

Finally, overmolding copper on a tungsten target is something that is complicated to perform. It entails melting the copper at a high temperature, including the target, cooling while ensuring perfect contact between the tungsten and the copper, machining the surface and suitable cleaning so that it can operate in a vacuum.

SUMMARY OF THE INVENTION

The invention aims to overcome certain problems of the prior art. To this end, one subject of the invention is a production method for producing an anode for a cold cathode X-ray source, which comprises a step of hard soldering the target and the target support (which provides for the removal of the thermal power). Thus, the assembly of the target with its support is greatly facilitated and allows the creation of an anode comprising a target support using materials that could not have been used for overmolding the target as in the prior art. Depending on the choice of material for the target support, the anode advantageously allows for easier assembly of the anode with a ceramic insulating element in the X-ray source. That means that the X-ray source can be further miniaturized.

To this end, one subject of the invention is a production method for producing an anode for a cold cathode X-ray source, comprising the following steps:

A. producing an element referred to as target from a first material adapted to generating X-rays from the absorption of an electron beam, the first material having a first thermal expansion coefficient $C_{e,1}(T_u)$ at a predetermined temperature $T_u$ of use of the anode in said X-ray source, B. producing an element referred to as target support from a second material having a second thermal expansion coefficient $C_{e,2}(T_u)$ at the predetermined temperature $T_u$, C. joining the target to the target support by hard soldering using a solder material, at a soldering temperature higher than a melting point of the solder material and in such a way as to form a film of solder interposed between the target and the target support, said predetermined temperature $T_u$ being lower than said melting point of the solder material.

According to one embodiment of the invention, the first and second materials are such that $|C_{e,1}(T_u)-C_{e,2}(T_u)|\leq XX$.

According to one embodiment of the invention, the first material is based on tungsten and wherein the second material is based on molybdenum, copper or an alloy containing copper, tungsten and nickel. As a preference, the solder material is based on gold, on silver, on copper, on nickel, or on palladium. Even more preferably, the second material is an alloy of copper, nickel and tungsten, the solder material is an alloy of silver, copper and palladium or else an alloy of silver, copper and gold.

According to one embodiment of the invention, the joining step is performed in a furnace at between 700° C. and 1100° C. As a preference, the joining step is performed under vacuum. Even more preferably, the solder material is an alloy of silver, copper and tin and the second material is molybdenum and the first material is tungsten.

According to one embodiment of the invention, the joining step is performed in a hydrogen atmosphere. As a preference, the second material is molybdenum and the first material is tungsten and the solder material is an alloy of silver, copper and palladium.

According to one embodiment of the invention, the method comprises an intermediate step B' between step B and step C, of metallizing the target support so as to form a metal layer of a thickness less than 150 μm around the target support. As a preference, the metallization is based on copper.

According to one embodiment of the invention, the target and the target support each have a shape adapted to allowing the target to be fitted into the target support.

Another subject of the invention is an anode for a cold cathode X-ray source, said anode being obtained by a production method as claimed in any one of the preceding claims and comprising:

a. the target, b. the target support, c. the film of solder interposed between the target and the target support so as to enable the target and the target support to be joined together.

Another subject of the invention is an X-ray source comprising:

d. a vacuum chamber e. a cathode adapted to emitting an electron beam within the vacuum chamber f. an anode as claimed in claim 11, arranged so that the electron beam strikes the target in such a way as to generate X-ray radiation.

According to one embodiment of the X-ray source of the invention, the cathode is adapted to emitting a pulsed electron beam, and wherein the target and the target support each have a volume large enough that said predetermined temperature is below 800° C. without any active thermal cooling element in the source.

BRIEF DESCRIPTION OF THE DRAWINGS

Other features, details and advantages of the invention will become apparent on reading the description given with reference to the appended drawings, which are given by way of example and in which, respectively.

In the figures, unless otherwise indicated, elements have not been drawn to scale.

DETAILED DESCRIPTION

Figure 2A:
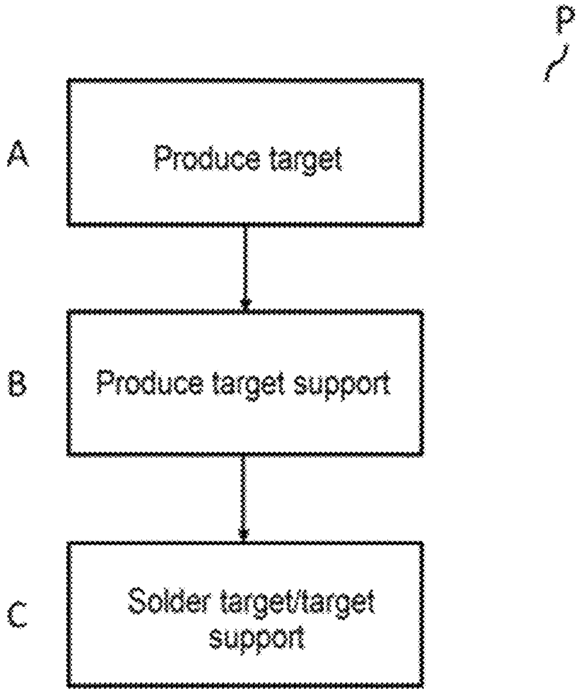
FIG. 2A shows a method for producing an anode for a cold cathode X-ray source according to the invention.

FIG. 2A is a depiction of a method P for producing an anode for a cold cathode X-ray source according to the invention. By way of clarification, a "cold cathode X-ray source" here means a source comprising a cathode that emits an electron beam through a field effect. This type of cathode is described for example in document WO 2006/063982 A1. Cold cathodes do not have the disadvantages of hot cathodes—or thermionic cathodes—(expansion or evaporation of electrically conducting elements), they allow very rapid switching between the emission of electrodes and the off state, and, above all, are far more compact. The production method of FIG. 2A allows the production of the anode A which is intended to be used in a cold cathode X-ray source, and which is illustrated in a schematic cross-sectional view in FIG. 2B.

The production method of the invention comprises a first step A of producing a target C. This target C is an element known to those skilled in the art and is made from a first material adapted to generating X-rays from the absorption of an electron beam. The first material has a first thermal expansion coefficient, denoted $C_{e,1}(T_u)$, at a predetermined temperature $T_u$ of use of the anode in the X-ray source. This target may be made from a material with a high atomic number, such as tungsten (pure or tungsten alloy) so as to produce the best X-ray generation yield, or from materials of a lower atomic number, in the case of sources used in the context of X-ray diffraction.

The method additionally comprises a step B of producing an element referred to as target support SC from a second material having a second thermal expansion coefficient $C_{e,2}(T_u)$ at the predetermined temperature $T_u$. The role of the target support is to dissipate the thermal energy produced by the target when braking the electron beam. Also, this second material is preferably a good conductor of heat.

It must be appreciated that the order of steps A and B in the method P is interchangeable.

Finally, the method of the invention comprises a last step C of joining the target C to the target support SC using hard soldering with a solder material at a soldering temperature higher than a melting point of the solder material. In addition, in order to prevent the two components of the anode from becoming unsoldered while the X-ray source is in operation, the predetermined temperature $T_u$ of use of the anode in the X-ray source is lower than the melting point of the solder material. What is meant here by "hard soldering" is that the melting point of the solder material is above 600° C. Step C therefore makes it possible to obtain a film of solder FB interposed between the target C and the target support SC.

Figure 2B:
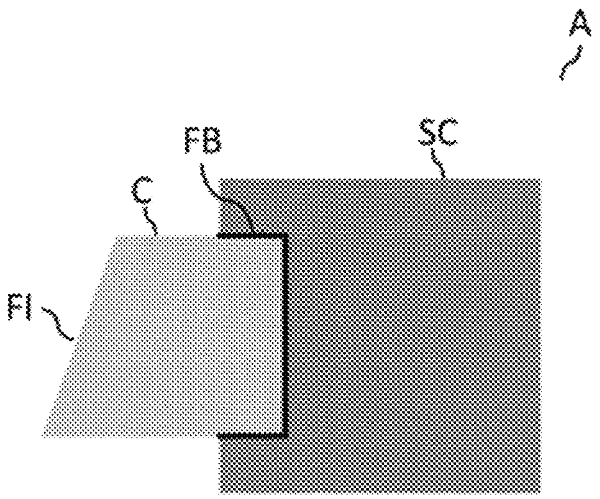
FIG. 2B is a schematic view of an anode for a cold cathode X-ray source according to the invention.

As illustrated in FIG. 2B, the anode obtained by the method of the invention therefore comprises the target C, the target support SC and the film of solder FB interposed between the target and the target support so as to allow the target and the target support to be joined together. The thickness of the film FB is preferably comprised between 5 and 140 μm after step C in order to ensure correct joining of the target and the target support.

Figure 1:
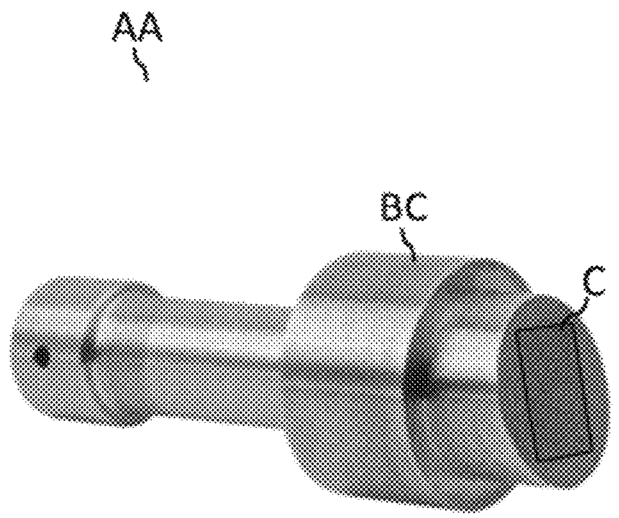
FIG. 1 is a schematic view of an example of an anode AA of an X-ray source of the prior art

The method of the invention allows the target and the target support to be assembled using a second material which could not have been used for overmolding the target, as would have been done with copper in the prior art. Thus, according to one embodiment, the second material is based on molybdenum or an alloy containing copper, tungsten and nickel. These second materials are not suited to overmolding the target C but are advantageous because they allow good thermal behavior of the anode in the event of an increase in temperature for a target made of tungsten. Furthermore, these materials can be soldered to a ceramic using hard soldering. Thanks to the method of the invention it is therefore possible to form an X-ray source comprising a component made of ceramic—to form both a support for the cathode and a support for the anode, and to provide the electrical insulation between the anode and the cathode—and soldered to the target support. Such an assembly is difficult to achieve with the copper overmolding BC of the anode in FIG. 1, as copper cannot be properly soldered to ceramic because of the high levels of thermal expansion of copper compared to most ceramics.

In summary, the production method of the invention enables the creation of an X-ray source of far smaller size than the sources of the prior art while at the same time including an insulator made of ceramic soldered to the anode A of the invention.

More generally, according to one preferred embodiment, in order to avoid thermal problems when the X-ray source containing the anode of the invention is in operation, the first and second materials are such that $|C_{e,1}(T_u)-C_{e,2}(T_u)|\leq 4\times 10^{-6}\ K^{-1}$. This feature ensures that the target and the target support do not become unsoldered when the source comprising the anode of the invention is in operation.

In one preferred embodiment, denoted MP, the joining step C is performed in a furnace at between 700° C. and 1100° C. and the cycle may last a minimum of 3 hours, with at least 3 minutes spent at the high temperature level. This minimum duration is necessary to ensure suitable joining and a uniform film of solder between the target and the target support. According to one embodiment, the furnace in which the soldering is performed comprises a thermal cooling element that is activated after a first phase of heating has enabled the melting of the solder material. This thermal cooling element allows a reduction in the total solder cycle time.

In a first variant of the embodiment MP, the joining step C is performed in the furnace under vacuum, a high vacuum of at minimum $10^{-3}$ mbar at the maximum temperature of the soldering cycle. This embodiment avoids the need for an additional later step of degassing the anode before assembling it with the rest of the elements of the X-ray source and before this anode is used under ultrahigh vacuum. The overall process of assembling the X-ray source is therefore simplified in this first variant of the embodiment MP.

Alternatively, according to a second variant of the embodiment MP, the joining step C is performed in a hydrogen atmosphere. The hydrogen atmosphere allows a more uniform temperature to be obtained within the furnace, thus allowing a better quality soldered joint to be achieved. However, this second variant requires a later step of degassing the anode before assembling it with the rest of the elements of the X-ray source. This degassing step is needed in order to eliminate the gases trapped in the solder, the surfaces of the sub-assembly, and thus avoid phenomena of desorption when the source is in operation.

As a preference, the solder material is based on gold, on silver, on palladium, on copper, or on nickel. Even more preferably, the solder material is an alloy of silver, copper and tin when the second material is molybdenum and the first material is tungsten if the soldering is performed under vacuum. Alternatively, according to another embodiment, the solder material is preferably an alloy of silver, copper and palladium, if the soldering is not performed under vacuum. The aforementioned two alloys of solder material are able to counteract the poor wettability of molybdenum.

Alternatively, when the second material is an alloy of copper, nickel and tungsten, and the first material is tungsten, the solder material is preferably an alloy of silver, copper and palladium or else an alloy of silver, copper and gold. Thus, the solder wets perfectly and diffuses into the deposit of copper of the second material, allowing excellent soldering of the whole.

In the example of FIG. 2B, optionally, the target C has an inclined face FI. This inclination is obtained by reaching a compromise regarding various physical parameters of the source: thermal, angle of incidence of the electron beam and focal spot required.

As a preference, and as illustrated in FIG. 2B, the target and the target support each have a shape adapted to allowing the target to be fitted into the target support. This feature allows for easier assembly of the target support with the target during step C of the method of the invention.

Figure 3A:
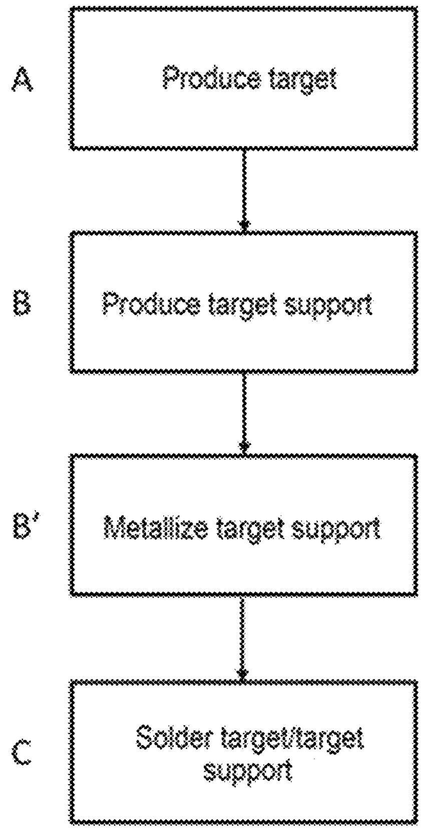
FIG. 3A shows a method for producing an anode for a cold cathode X-ray source according to one embodiment of the invention.
Figure 3B:
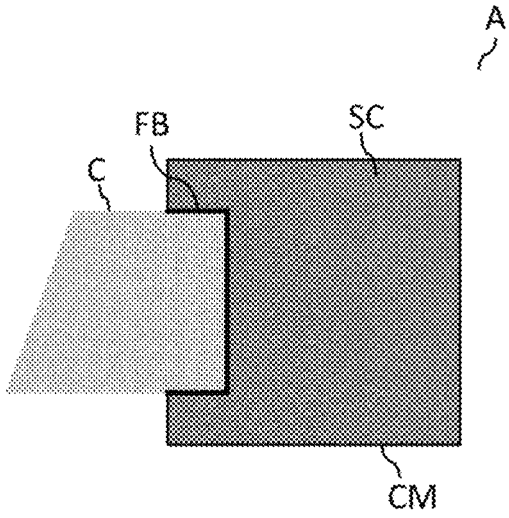
FIG. 3B is a schematic view of an anode for a cold cathode X-ray source according to one embodiment of the invention.

FIG. 3A illustrates a method for producing the anode according to one particular embodiment of the invention. FIG. 3B illustrates a schematic view in cross section of the anode produced by the production method of FIG. 3A.

Figure 4:
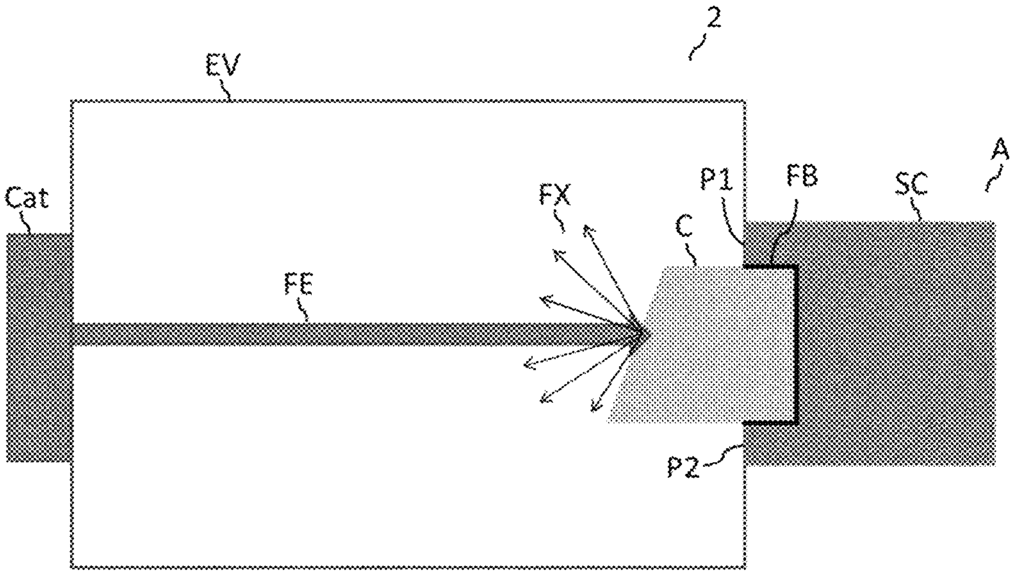
FIG. 4 is a schematic view of a cold cathode X-ray source according to the invention.

Compared with the method of FIG. 2A, the method of FIG. 4 comprises an intermediate step B' between step B and step C, of metallizing the target support so as to form a metal layer CM of a thickness less than 0.15 mm around the target support. This step B' further improves the wettability of the target support and limits the phenomenon of diffusion of the solder material into the target support, thus ensuring that the joints made by hard soldering remain airtight under ultrahigh vacuum. This step B' is particularly advantageous when the second material is an alloy of copper, nickel and tungsten.

FIG. 4 schematically illustrates an X-ray source 2 comprising:

g. a chamber EV adapted to be placed under vacuum
h. a cathode Cat adapted to emitting an electron beam FE within the vacuum chamber
i. an anode A according to the invention, arranged so that the electron beam strikes the target in such a way as to generate X-ray radiation denoted FX.

As a preference, the second material is molybdenum, copper or an alloy containing copper, tungsten and nickel, and the chamber EV is partially or fully formed from ceramic so as to provide the electrical insulation between the anode and the cathode. Thus, according to one advantageous embodiment, the chamber EV is assembled with the anode A by hard soldering to one another the target support and the ceramic portions P1, P2 of the chamber EV. This final soldering step is rendered particularly easy as a result of the choice of the second material, this choice of material itself being rendered possible by virtue of the production method of the invention. Furthermore, these second materials exhibit a mechanical behavior, when subjected to an increase in temperature, that is far better suited to soldering to a ceramic than the copper used in the prior art. That makes it possible to obtain, between the chamber EV and the anode, a joint that is particularly airtight and compatible with operation in the chamber under ultrahigh vacuum, without prior metallization of the ceramic.

As a preference, the cathode is adapted to emitting a pulsed electron beam through a field effect and the target and the target support each have a volume large enough that the predetermined temperature $T_u$ is below 800° C. What that means to say is that the target and the target support exhibit enough area and volume thermal dissipation that the temperature $T_u$ remains below 800° C. in pulsed operation. This preserves the integrity of the anode and ensures correct operation thereof throughout its life-cycle. In this embodiment, the source 2 does not require an active thermal cooling element in the source in order to maintain the predetermined temperature $T_u$ of the anode.

An exhaustive description of all the elements that may be comprised in the X-ray source is outside of the scope of the invention. However, according to particular embodiments of the invention, the source of the invention comprises various elements known to those skilled in the art to be found in X-ray sources. For example, the source 2 comprises an electrode (not depicted in FIG. 4) positioned near the cathode and able to focus the electron beam FE onto the target C. This type of electrode is known as a beam focusing electrode.

The invention claimed is:

1. A production method (P) for producing an anode (A) for a cold cathode X-ray source, comprising the following steps:

A. producing an element referred to as target (C) from a first material adapted to generating X-rays from the absorption of an electron beam, the first material having a first thermal expansion coefficient $C_{e,1}(T_u)$ at a predetermined temperature $T_u$ of use of the anode in said X-ray source, B. producing an element referred to as target support (SC) from a second material having a second thermal expansion coefficient $C_{e,2}(T_u)$ at the predetermined temperature $T_u$, C. joining the target to the target support by hard soldering using a solder material, at a soldering temperature higher than a melting point of the solder material and in such a way as to form a film of solder (FB) interposed between the target and the target support, said predetermined temperature $T_u$ being lower than said melting point of the solder material.

2. The production method as claimed in claim 1, wherein the first and second materials are such that $|C_{e,1}(T_u)-C_{e,2}(T_u)|\leq 4\cdot 10^{-6}\ K^{-1}$.

3. The production method as claimed in claim 1, wherein the first material is based on tungsten and wherein the second material is based on molybdenum, copper or an alloy containing copper, tungsten and nickel.

4. The production method as claimed in claim 3, wherein the solder material is based on gold, on silver, on copper, on nickel, or on palladium.

5. The production method as claimed in claim 4, wherein the second material is an alloy of copper, nickel and tungsten, the solder material is an alloy of silver, copper and palladium or else an alloy of silver, copper and gold.

6. The production method as claimed in claim 1, wherein the joining step is performed in a furnace at between 700° C. and 1100° C.

7. The production method as claimed in claim 6, wherein the joining step is performed under vacuum.

8. The production method as claimed in claim 7, wherein the solder material is an alloy of silver, copper and tin and the second material is molybdenum and the first material is tungsten.

9. The production method as claimed in claim 5, wherein the joining step is performed in a hydrogen atmosphere.

10. The production method as claimed in claim 9, wherein the second material is molybdenum and the first material is tungsten and the solder material is an alloy of silver, copper and palladium.

11. The production method as claimed in claim 1, comprising an intermediate step B' between step B and step C, of metallizing the target support so as to form a metal layer (CM) of a thickness less than 150 μm around the target support.

12. The production method as claimed in claim 11, wherein the metallization is based on copper.

13. The production method as claimed in claim 1, wherein the target and the target support each have a shape adapted to allowing the target to be fitted into the target support.

14. An anode for a cold cathode X-ray source, said anode being obtained by a production method as claimed in claim 1 and comprising:

the target, the target support, the film of solder interposed between the target and the target support so as to enable the target and the target support to be joined together.

15. An X-ray source comprising:

a vacuum chamber (EV)

a cathode (Cat) adapted to emitting an electron beam (FE) within the vacuum chamber an anode as claimed in claim 14, arranged so that the electron beam strikes the target in such a way as to generate X-ray radiation (FX).

16. The X-ray source as claimed in claim 15, wherein the cathode is adapted to emitting a pulsed electron beam, and wherein the target and the target support each have a volume large enough that the predetermined temperature is below 800° C. without any active thermal cooling element in the source.

* * * * *